(12) United States Patent
Boyer et al.

(10) Patent No.: US 7,303,733 B2
(45) Date of Patent: Dec. 4, 2007

(54) GAS/LIQUID SEPARATION SYSTEM USED IN A HYDROCARBONCONVERSION PROCESS

(75) Inventors: Christophe Boyer, Charly (FR); Abdelhakim Koudil, Lyons (FR); Thiery Gauthier, Saint Genis Laval (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 907 days.

(21) Appl. No.: 10/647,333

(22) Filed: Aug. 26, 2003

(65) Prior Publication Data

US 2004/0040892 A1 Mar. 4, 2004

Related U.S. Application Data

(62) Division of application No. 09/495,914, filed on Feb. 2, 2000, now Pat. No. 6,645,369.

(30) Foreign Application Priority Data

Sep. 24, 1999 (FR) .................................. 99 12034

(51) Int. Cl.
  *C10G 31/11* (2006.01)
  *C10G 9/00* (2006.01)
  *C10G 7/00* (2006.01)

(52) U.S. Cl. ...................... 422/243; 208/100; 208/308; 422/255

(58) Field of Classification Search .................. 96/155, 96/204, 207, 208, 215; 422/243, 255; 208/308
See application file for complete search history.

(56) References Cited

U.S. PATENT DOCUMENTS

| 4,354,852 A | 10/1982 | Kydd |
| 5,186,836 A | 2/1993 | Gauthier et al. |
| 5,253,403 A | 10/1993 | Hookham |
| 5,526,684 A | 6/1996 | Liu et al. |
| 5,586,998 A | 12/1996 | Gauthier |
| 5,624,642 A | 4/1997 | Devanathan et al. |
| 6,164,308 A * | 12/2000 | Butler ........................... 137/2 |

FOREIGN PATENT DOCUMENTS

| DE | 12 58 393 | 1/1968 |
| EP | 0 085 206 | 8/1983 |
| GB | 2 036 606 | 7/1980 |
| GB | 2 284 165 | 5/1995 |

* cited by examiner

*Primary Examiner*—Walter D. Griffin
*Assistant Examiner*—Lessanework T Seifu
(74) *Attorney, Agent, or Firm*—Millen, White, Zelano & Branigan, P.C.

(57) ABSTRACT

The present invention concerns a gas/liquid(s) separation system constituted by three different sections:
a primary separator (1) for flows with a G/L in the range 0.1 to 10;
a secondary separator (2) for flows with a G/L in the range 10 to 50;
a system (3) which limits the formation of a liquid vortex;
where G/L is the ratio of the gas to liquid mass flow rates.

19 Claims, 2 Drawing Sheets

GAS/LIQUID SEPARATION SYSTEM USED IN A HYDROCARBONCONVERSION PROCESS

This application is a divisional of U.S. application Ser. No. 09/495,914, filed Feb. 2, 2000, now U.S. Pat. No. 6,645,369, which claimed priority of FR-99/12.034, filed Sep. 24, 1999.

The present invention is applicable to refining or petrochemical processes and in general to any conversion simultaneously using a liquid phase—or at least one hydrocarbon—and a gas phase—a mixture of hydrogen and hydrocarbon vapour fractions—in thermodynamic equilibrium with the liquid phase. The invention relates to the field of processes functioning, for example, with a ratio of gas to liquid mass flow rates, G/L, normally in the range 0.1 to 10, usually in the range 0.5 to 2. It is of particular application to hydrotreatment processes.

The particular aim of the process is to convert at least a portion of a hydrocarbon feed, for example an atmospheric residue obtained by straight run distillation of a crude petroleum, into light gasoline and gas oil fractions and into a heavier product which can be used as a feed for a more selective conversion process such as fluidised bed catalytic cracking, for example after an intermediate deasphalting step (extraction of asphaltenes using a C3-C7 solvent). The process may also be aimed at converting a distillate obtained by vacuum distillation of an atmospheric residue from crude petroleum into light gasoline and gas oil fractions and into a heavier product which can be used as a feed in a more selective conversion process such as fluidised bed catalytic cracking. The invention also has application in processes for hydrotreating heavy or light hydrocarbon feeds, such as hydrodesulphurisation, hydrodenitrogenation or hydrodearomatisation processes.

Figure 1:
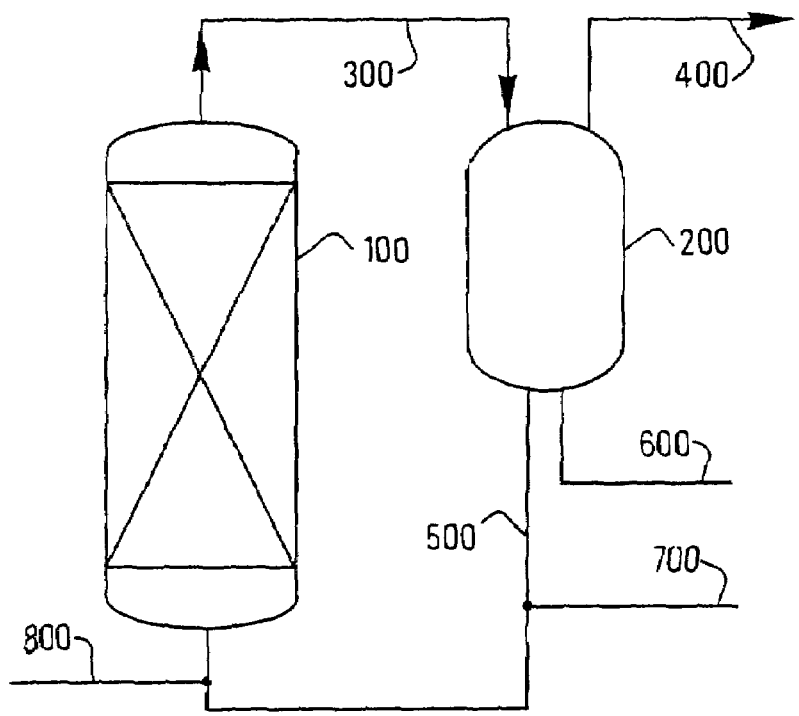

There are two types of arrangements for the proposed separator (FIG. 1). Separator (200), which is placed downstream of the liquid/gas outlet (300) from the reactor (100), can either be placed in the liquid recycling circuit of the reactor, or it can be placed in the final outlet from the reactor. The liquid from separation can then either be returned to the reactor via the recycle circuit (500), the product then being withdrawn downstream of (200) at (700), or it can constitute the product extraction from the process. The separated gas is evacuated via (400).

The residence time in the liquid separation system (200) is in the range 30 seconds to 10 minutes, usually in the range 1 to 3 minutes, for example close to 2 minutes. The range of the ratio of the gas to liquid mass flow rates, G/L, is in the range 0.1 to 10, preferably in the range 0.5 to 2. The liquid mass flow rates in the inlet line (300) at the separator inlet (200) are generally in the range 100 to 4000 $kg/s/m^2$. These gas mass flow rates are usually in the range 100 to 800 $kg/s/m^2$ in the separator inlet line (300).

The fluid temperature is generally in the range 20° C. to 600° C., preferably in the range 300° C. to 450° C., and the operating pressure can be in the range 1 to 200 bars. The dynamic viscosity of the gas is in the range $10^{-2}$ to $2\times10^{-2}$ cP; that of the liquid is in the range 0.3 to 5 cP. The surface tension is in the range 20 to 70 mN/m. The liquid density is generally in the range 500 to 1000 $kg/m^3$, usually in the range 500 to 700 $kg/m^3$. The gas density is normally in the range 1 to 50 $kg/m^3$, usually in the range 30 to 50 $kg/m^3$.

One of the original features of this separation process is that it can function properly at low values of $\Delta\rho=\rho_L-\rho_G$ (close to 500 $kg/m^3$) and over a wide range of mass flow ratios G/L (in the range 0.1 to 10).

The system can continue to function when the liquid phase contains solid particles of an organic or mineral nature.

DESCRIPTION OF THE SYSTEM AND ASSOCIATED PROCESS

Figure 2:
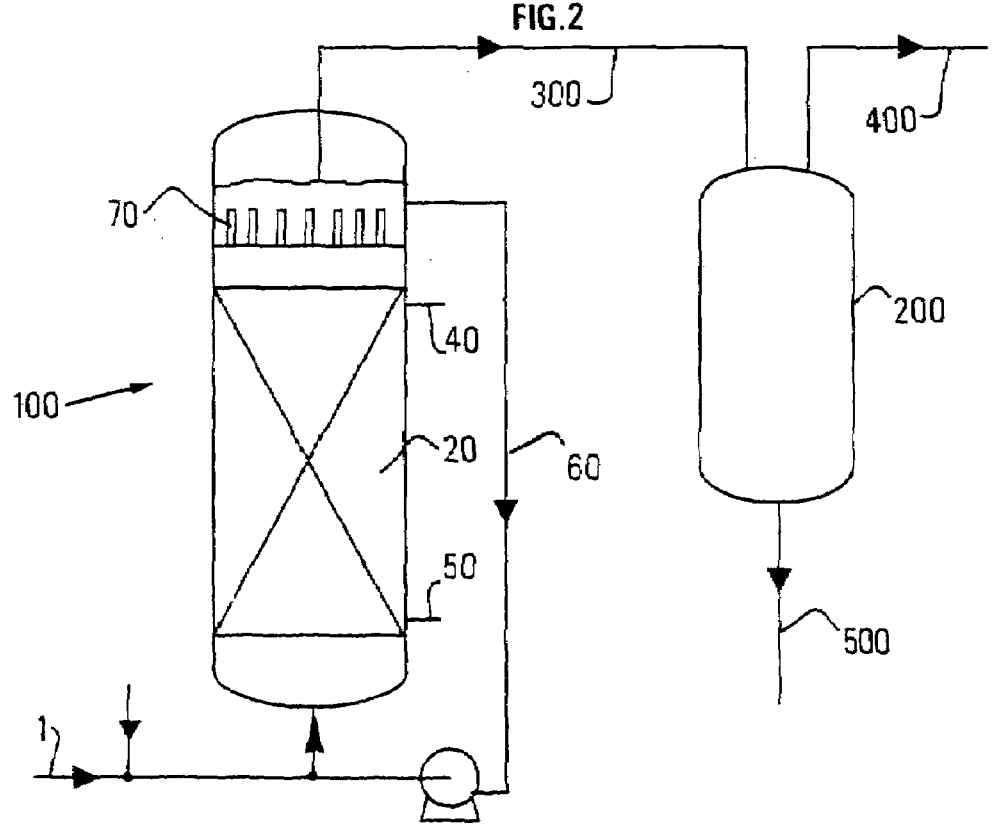

The process associated with the present invention is intended, for example, to treat a vacuum distillate from a zone for vacuum distillation of a crude petroleum. The hydrotreatment process (FIG. 2) generally functions in the presence of hydrogen and comprises at least one three-phase reactor (100) containing a hydrotreatment catalyst which converts in an ebullated bed (20), generally functioning in liquid and gas upflow mode. The reactor preferably comprises at least one means (50) for extracting catalyst from said reactor located close to the base of the reactor and at least one means (40) for adding fresh catalyst close to the top of said reactor. Said reactor comprises at least one circuit for recycling liquid phase (60), located inside or outside the reactor, and intended to maintain a sufficient degree of expansion necessary for the bed to function in a three-phase ebullated operation. At the top of the reactor, downstream of the bed expansion, an axial gas/liquid separation system inside the reactor can separate the liquid phase to be recycled (70). The level of the liquid in this internal separator is maintained by line (300), allowing the gas phase to escape and withdrawing liquid phase products. The flow of these two phases then enters the separator of the present invention (200).

Excellent gas-liquid separation must be achieved downstream of the reactor. If liquid is entrained at the gas outlet, this can generate process fluctuations in the heat exchangers. Similarly, if a gas fraction is withdrawn from the liquid outlet in the form of pockets, this will cause pressure peaks in the lines downstream of the separator which will destabilise the steady flow of the products. These dysfunctions are thus deleterious to the operation of the units located downstream of the gas/liquid separator. In the case of hydrotreatment or hydroconversion units, this also leads to an expensive loss of hydrogen, and it is thus vital to provide a system which can permit rapid and effective separation of the two liquid and gas phases associated with good regulation of the liquid level in the vessel.

In order to limit exposure of the liquid to the high temperature outside the reactor to limit thermal degradation, the residence time for the liquids must be limited.

Thus the invention proposes an effective gas-liquid separation process which can enable liquid to be evacuated rapidly, characterized in that this system remains effective when the liquid-gas density difference is small (400-1000 $kg/m^3$).

This process for separating liquid(s) and gas originating from a hydrocarbon conversion zone is carried out in a zone generally comprising three successive sections; the first section, the primary section, functioning for flows with a G/L in the range about 0.1 to 10; the second section, the secondary section, functioning for flows with a G/L in the range about 10 to 50, and the third section acting to limit the formation of a liquid vortex, where G/L is the ratio of the gas to liquid mass flow rates.

Figure 3:
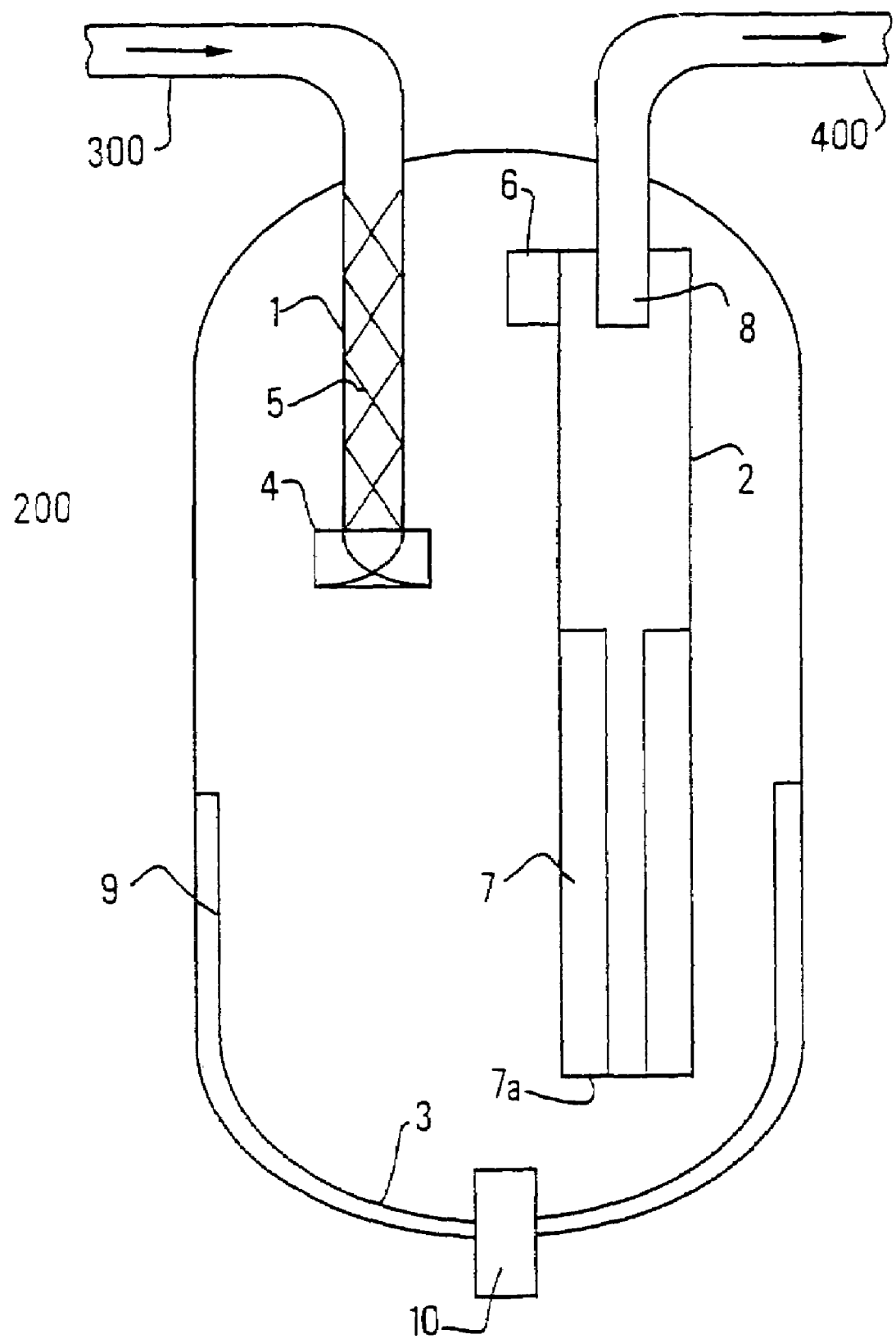

The present invention also concerns a separation system or apparatus constituted by three different sections (see FIG. 3):

a primary separator (1) for flows with a G/L in the range 0.1 to 10;

a secondary separator (2) for flows with a G/L in the range 10 to 50, a system which limits the formation of a liquid vortex (3).

The dimensions of the vessel (200) and the position imposed on the normal level of liquid in vessel (200) are determined so as to impose a residence time in the range 1 to 10 minutes, preferably close to 2 minutes.

The separator must achieve a separation efficiency such that no more than 0.1% to 0.5% maximum (by weight) of liquid remains in the gas phase at the separator outlet and no more than 0.5% to 1% maximum (by weight) of gas remains in the liquid phase at the separator outlet.

The primary separator (1) is preferably constituted by a tube terminated by at least one tangential outlet, causing the flow to rotate through 90° at the tube outlet. As an example, the ratio of the area of the openings in each tangential outlet and the area of the cross section of flow in the tube is in the range 0.25 to 1, preferably 0.5. The ratio between the height and width of each opening is in the range 1 to 4, preferably 2. Inside the tube, upstream of the tangential outlets, a helix can be added. This helix (5) can be a single or double helix. The ratio of the helix width, corresponding to the cross section of flow of the fluids, to the tube diameter is generally in the range 0.5 to 1. The pitch number of the helix (i.e., the ratio of the total height to the helix pitch) is generally in the range 1 to 6, and preferably in the range 2 to 3.

The primary separator (1) is traversed by the whole of the gas/liquid flow entering the separator. The efficacy of this separator is generally in the range 70% to 90% on the gas outlet side. The gas flow produced from the gas/liquid separation in the primary separator (1) is directed towards the secondary separator (2).

The secondary separator (2) is constituted by a cyclone with a free tangential inlet (6). As an example, the tangential inlet (6) has a rectangular cross section, and the ratio of the width to the height of this cross section is in the range 0.2 to 0.6, preferably close to 0.5. The ratio of the cross sectional area of the inlet to the cross sectional area of the cyclone (2) is generally in the range 0.06 to 0.25, usually close to 0.12. The ratio of the diameter of the gas flow outlet line (8) to the cyclone diameter is generally in the range 0.3 to 0.6, preferably close to 0.5. This ratio must be maximised so as to reduce the ΔP (difference in pressure between the inlet and outlet of the cyclone) in the cyclone. The ratio of the height of the gas outlet line (8) to the cyclone diameter is normally in the range 0 to 1, usually close to 0.5. The liquid outlet from this cyclone (7a) is always below the liquid level in the separator vessel (200). The liquid outlet from the cyclone (7) is the same diameter as the cyclone and comprises blades attached to the walls. These blades are distributed at a constant angular spacing and there are 2 to 8 or them, for example 4. The ratio of the width of these blades to the cyclone diameter is in the range 0.15 to 1, preferably close to 0.3. The height of the blades is defined so as to leave a distance between the top of the cyclone and the top of the blades in the range 2 to 5 diameters of the cyclone, preferably 2 to 3 diameters of the cyclone, and the blades extend to the bottom of the cyclone. The depth of the liquid in vessel (200) must correspond to a minimum of the base of the outlet cone of vessel (200) and to the base of the cyclone. The maximum height of the liquid level must be less than 3 diameters of the cyclone from the top of the cyclone, preferably less than 4 to 6 diameters from the top of the cyclone so as to accommodate the pressure drop in the cyclone. The vertical distance separating the outlet (4) from the primary separator and the inlet (6) to the secondary separator must be greater than twice the height of the rectangular inlet (6), the tangential inlet to the cyclone separator being located above the tangential outlet (4) from the primary separator.

The combination of two separators (1) and (2) enables a good compactness to be obtained for the whole of the separator and in particular can limit the diameter of the vessel (200). Since the height of the cyclone acts only on the residence time of the gas, the proposed gas/liquid separator system can thus keep the residence time for the liquid low.

The base of the vessel (200) of the separator comprises a system (3) for preventing any formation of a vortex in the liquid phase to limit any gas from becoming entrained in the liquid outlet. This system is composed of blades (9) attached to the walls distributed at a constant angular spacing to dissipate the angular movement. There are 2 to 8 of these blades, preferably 4. The height of these blades is in the range between the maximum depth of the liquid and the bottom portion of the primary separator (1). The ratio between the width of these blades and the diameter of the vessel is in the range 0.02 to 0.1, preferably close to 0.05. In order to reduce the length and energy of the core of the vortex, a cylinder can be added at the base of the vessel (200), in the axis of flow of the outlet liquid. This cylinder will have the same diameter as the liquid outlet line and a height in the range 0.5 to 2 diameters of the liquid outlet line. This cylinder can have massive walls or a wall constituted by a screen and in that case it may be closed at its upper portion.

The invention claim is:

1. An apparatus comprising a separation vessel (200) having a gas flow outlet line and a liquid phase outlet line, and having three different sections:

a primary separator (1) for flows with a G/L in the range of 0.1 to 10 having a first gas/liquid inlet and a first outlet;

a secondary separator (2) for flows with a G/L in the range of 10 to 50 having a second gas/liquid inlet and a second outlet;

a system which limits the formation of a liquid vortex (3); where G/L is the ratio of the gas to liquid mass flow rates, wherein the secondary separator (2) further comprises a cyclone and said second gas/liquid inlet is a free tangential inlet (6), the free tangential inlet (6) having a rectangular cross section, and the ratio of the width to the length of this cross section being in the range of 0.2 to 0.6.

2. An apparatus according to claim 1, in which the dimensions of the separation vessel (200) and the position imposed on the normal level of liquid in separation vessel (200) are determined so as to impose a residence time in the range of 1 to 10 minutes; the separation vessel achieving a separation efficiency such that no more than 0.1 wt. % to 0.5 wt. % maximum of liquid remains in the gas phase at the gas flow outlet line and no more than 0.5 wt. % to 1 wt. % maximum of gas remains in the liquid phase at the liquid phase outlet line.

3. An apparatus according to claim 1, in which the primary separator comprises a tube terminated by said first outlet which has at least one tangential outlet, said tangential outlet causing the flow to rotate through 90° at the first outlet, the ratio of the area of the openings in each tangential outlet and the area of the cross section of flow in the tube being in the range of 0.25 to 1, and the ratio between the height and width of each opening being in the range of 1 to 4.

4. An apparatus according to claim 3, in which, in the primary separator, a helix is added inside the tube upstream of said at least one tangential outlet, said helix being a single or double helix, the ratio of the helix width, corresponding to the cross section of flow of the fluids, to the tube diameter being in the range of 0.5 to 1, and the pitch number of the helix being in the range of 1 to 6.

5. An apparatus according to claim 1, in which, in the secondary separator, the ratio of the cross sectional area of the free tangential inlet to the cross sectional area of the cyclone (2) is in the range of 0.06 to 0.25, and said cyclone is in fluid communication with said gas flow outlet line (8) wherein the ratio of the diameter of the gas flow outlet line (8) to the cyclone diameter is in the range of 0.3 to 0.6, and the ratio of the height of the gas outlet line (8) to the cyclone diameter is in the range of 0 to 1.

6. An apparatus according to claim 1, in which, in the secondary separator, the second outlet is a liquid outlet (7a) from the cyclone which is always below the liquid level in the separator vessel, the liquid outlet from the cyclone having the same diameter as the cyclone and comprising 2 to 8 blades attached to the walls, distributed at a constant angular spacing, and the ratio of the width of said blades to the cyclone diameter being in the range of 0.15 to 1.

7. An apparatus according to claim 1, in which the system limiting the formation of a liquid vortex comprises blades attached to the walls located at a constant angular spacing to dissipate the angular movement, said blades being 2 to 8 in number, and the height of these blades being in the range between the maximum depth of the liquid and the bottom portion of the primary separator (1).

8. An apparatus according to claim 1, in which a cylinder is added to the base of the separation vessel, in the axis of flow of the liquid phase outlet line, said cylinder having the same diameter as the liquid phase outlet line and a height in the range 0.5 to 2 diameters of the liquid phase outlet line, said cylinder having massive walls or is a wall constituted by a screen closed at its upper portion.

9. An apparatus according to claim 4, wherein the pitch number of the helix is in the range of 2 to 3.

10. An apparatus according to claim 2, in which the primary separator comprises a tube terminated by said first outlet which has at least one tangential outlet, said tangential outlet causing the flow to rotate through 90° at the first outlet, the ratio of the area of the openings in each tangential outlet and the area of the cross section of flow in the tube being in the range of 0.25 to 1, and the ratio between the height and width of each opening being in the range of 1 to 4.

11. An apparatus according to claim 2, in which the secondary separator (2) further comprises a cyclone and said second gas/liquid inlet is a free tangential inlet (6), the free tangential inlet (6) having a rectangular cross section, and the ratio of the width to the length of this cross section being in the range of 0.2 to 0.6.

12. An apparatus according to claim 3, in which the secondary separator (2) further comprises a cyclone and said second gas/liquid inlet is a free tangential inlet (6), the free tangential inlet (6) having a rectangular cross section, and the ratio of the width to the length of this cross section being in the range of 0.2 to 0.6.

13. An apparatus according to claim 4, in which the secondary separator (2) further comprises a cyclone and said second gas/liquid inlet is a free tangential inlet (6), the free tangential inlet (6) having a rectangular cross section, and the ratio of the width to the length of this cross section being in the range of 0.2 to 0.6.

14. An apparatus according to claim 5 in which, in the secondary separator, the second outlet is a liquid outlet (7a) from the cyclone which is always below the liquid level in the separator vessel, the liquid outlet from the cyclone having the same diameter as the cyclone and comprising 2 to 8 blades attached to the walls, distributed at a constant angular spacing, and the ratio of the width of said blades to the cyclone diameter being in the range of 0.15 to 1.

15. An apparatus according to claim 1, in which the system limiting the formation of a liquid vortex comprises blades attached to the walls located at a constant angular spacing to dissipate the angular movement, said blades being 2 to 8 in number, and the height of these blades being in the range between the maximum depth of the liquid and the bottom portion of the primary separator (1).

16. An apparatus according to claim 1, in which a cylinder is added to the base of the separation vessel, in the axis of flow of the liquid phase outlet line, said cylinder having the same diameter as the liquid phase outlet line and a height in the range 0.5 to 2 diameters of the liquid phase outlet line, said cylinder having massive walls or is a wall constituted by a screen closed at its upper portion.

17. An apparatus comprising a separation vessel (200) having a gas flow outlet line and a liquid phase outlet line, and having three different sections:
   a primary separator (1) for flows with a G/L in the range of 0.1 to 10 having a first gas/liquid inlet and a first outlet;
   a secondary separator (2) for flows with a G/L in the range of 10 to 50 having a second gas/liquid inlet and a second outlet;
   a system which limits the formation of a liquid vortex (3); where G/L is the ratio of the gas to liquid mass flow rates;
   wherein said primary separator comprises a tube terminated by said first outlet which has at least one tangential outlet, said tangential outlet causing the flow to rotate through 90° at the first outlet, the ratio of the area of the openings in each tangential outlet and the area of the cross section of flow in the tube being in the range of 0.25 to 1, and the ratio between the height and width of each opening being in the range of 1 to 4, and
   within said primary separator, a helix is added inside the tube upstream of said at least one tangential outlet, said helix being a single or double helix, the ratio of the helix width, corresponding to the cross section of flow of the fluids, to the tube diameter being in the range of 0.5 to 1, and the pitch number of the helix being in the range of 1 to 6.

18. An apparatus comprising a separation vessel (200) having a gas flow outlet line and a liquid phase outlet line, and having thee different sections:
   a primary separator (1) for flows with a G/L in the range of 0.1 to 10 having a first gas/liquid inlet and a first outlet;
   a secondary separator (2) for flows with a G/L in the range of 10 to 50 having a second gas/liquid inlet and a second outlet;
   a system which limits the formation of a liquid vortex (3); where G/L is the ratio of the gas to liquid mass flow rates;
      wherein the system limiting the formation of a liquid vortex comprises blades attached to the walls located at a constant angular spacing to dissipate the angular movement, said blades being 2 to 8 in number, and the height of these blades being in the range between the maximum depth of the liquid and the bottom portion of the primary separator (1).

19. An apparatus comprising a separation vessel (200) having a gas flow outlet line and a liquid phase outlet line, and having three different sections:
- a primary separator (1) for flows with a G/L in the range of 0.1 to 10 having a first gas/liquid inlet and a first outlet;
- a secondary separator (2) for flows with a G/L in the range of 10 to 50 having a second gas/liquid inlet and a second outlet;
- a system which limits the formation of a liquid vortex (3);

where G/L is the ratio of the gas to liquid mass flow rates;
wherein a cylinder is added to the base of the separation vessel, in the axis of flow of the liquid phase outlet line, said cylinder having the same diameter as the liquid phase outlet line and a height in the range 0.5 to 2 diameters of the liquid phase outlet line, said cylinder having massive walls or is a wall constituted by a screen closed at its upper portion.

* * * * *